(12) United States Patent
Cherian et al.

(10) Patent No.: US 8,861,374 B2
(45) Date of Patent: Oct. 14, 2014

(54) METHODS AND APPARATUS FOR COMPENSATING FOR TIME-BASED SAMPLING BY SAMPLE PACKET ELIMINATION DURING EXPORT OF SAMPLED PACKETS

(75) Inventors: Zachariah Cherian, Cupertino, CA (US); Eric Tsoh-Chang Chao, Santa Clara, CA (US); Neal Kaushal Gokli, Sunnyvale, CA (US); Stacy Lee Martin, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 13/435,364

(22) Filed: Mar. 30, 2012

(65) Prior Publication Data

US 2013/0258858 A1    Oct. 3, 2013

(51) Int. Cl.
 *H04L 12/26*   (2006.01)
(52) U.S. Cl.
 USPC .......................................... 370/241; 370/229
(58) Field of Classification Search
 USPC ........................................................ 370/241
 See application file for complete search history.

(56) References Cited

U.S. PATENT DOCUMENTS

| | | | |
|---|---|---|---|
| 7,848,899 B2 * | 12/2010 | Lai et al. ...................... | 702/118 |
| 2005/0190695 A1 * | 9/2005 | Phaal ............................ | 370/229 |
| 2006/0092846 A1 * | 5/2006 | Loh et al. ..................... | 370/241 |
| 2007/0260410 A1 * | 11/2007 | Raymond ....................... | 702/81 |
| 2008/0059121 A1 * | 3/2008 | Bartik et al. .................. | 702/186 |
| 2011/0264822 A1 * | 10/2011 | Ferguson et al. ............. | 709/235 |
| 2011/0320447 A1 * | 12/2011 | Chen et al. .................... | 707/737 |

* cited by examiner

*Primary Examiner* — Christopher Grey
*Assistant Examiner* — Fangyan Deng
(74) *Attorney, Agent, or Firm* — Meunier Carlin & Curfman, LLC

(57) ABSTRACT

Methods and apparatus for compensating for time-based sampling using packet elimination are disclosed herein. An example method may be implemented in a network device communicatively connected to a network. The method may include: receiving a packet over the network at a monitoring point; replicating the received packet; determining whether to sample the replicated packet using a time-based sampling scheme; upon determining that the replicated packet should be sampled, queuing the replicated packet to a port of the network device; determining whether to eliminate the queued packet by comparing a configured sample rate with a current sample rate; upon determining that the current sample rate is less than the configured sample rate, exporting the queued packet from the network device; and upon determining that the current sample rate is greater than or equal to the configured sample rate, dropping the queued packet.

20 Claims, 4 Drawing Sheets

METHODS AND APPARATUS FOR COMPENSATING FOR TIME-BASED SAMPLING BY SAMPLE PACKET ELIMINATION DURING EXPORT OF SAMPLED PACKETS

BACKGROUND

A network flow may be defined as a set of packets passing a monitoring point in a network during a certain period of time. The monitoring point may be a particular data source such as an interface of a network device, for example. All of the packets belonging to a particular flow share a set of common characteristics. The characteristics may be ascertained by examining the packet itself and may include a source IP address, a destination IP address, a source port, a destination port, a protocol, a service to be performed on the packet or any other packet characteristic. By choosing the characteristics defining a particular flow, the particular flow may be defined somewhere between all network traffic observed at the monitoring point or a single packet sent between network applications observed at the monitoring point.

The collection of network flow data may provide valuable information about the overall network traffic. For example, a set of sample packets may be analyzed to estimate characteristics of the overall network traffic. This may be done without collecting network flow data for every packet observed at the monitoring point, which would be a difficult task due to the high volume of network traffic. The network flow data may provide information that may be used to make decisions regarding network traffic engineering, the provision of network services, billing based on network usage, etc.

There are many network packet sampling schemes available. Packet sampling schemes are designed to be random and to prevent synchronization with any specific network traffic pattern. Two example network sampling schemes are packet-based sampling and time-based sampling. Packet-based sampling schemes are designed to sample 1 out of every N packets (i.e., 1-in-N sampling) observed at the monitoring point. Systematic, multi-stage and simple random sampling are example schemes that are well known in the art. Time-based sampling schemes are designed to sample N packets in every predetermined time interval. Time-based sampling schemes may be designed to achieve a desired sample rate such as 1-in-N sampling. Time-based sampling schemes are simple and commonly implemented on the application-specific IC ("ASIC") of network devices. For example, the maximum expected packet rate on a 1 Gigabit Ethernet port is 1.488 Mpps (assuming a 64 byte packet size). Thus, to achieve 1-in-32 sampling, forty-seven packets must be sampled every millisecond. When the actual packet rate is less than maximum, however, time-based sampling schemes result in extra packets being sampled (i.e., oversampling). In particular, time-based sampling schemes fail to account for the observed rate of network traffic. Oversampling creates undesired consequences such as reducing the accuracy of the estimated characteristics of the overall network traffic and/or placing an unnecessary burden on the network resources.

SUMMARY

Methods and apparatus for compensating for time-based sampling using packet elimination are disclosed herein. An example method may be implemented in a network device communicatively connected to a network, for example. The example method may include: receiving a packet over the network at a monitoring point of the network device; replicating the received packet; determining whether to sample the replicated packet using a time-based sampling scheme; upon determining that the replicated packet should be sampled, queuing the replicated packet to a port of the network device; determining whether to eliminate the queued packet by comparing a configured sample rate with a current sample rate; upon determining that the current sample rate is less than the configured sample rate, exporting the queued packet from the network device; and upon determining that the current sample rate is greater than or equal to the configured sample rate, dropping the queued packet. The time-based sampling scheme may include sampling a predetermined number of samples each predetermined time interval.

The method may include dropping the packet in response to determining that the replicated packet should not be sampled.

Alternatively or additionally, when determining whether to sample the replicated packet using a time-based sampling scheme, the method may include: allocating a number of sample credits during the predetermined time interval based on a maximum expected packet rate at the monitoring point of the network device and the configured sample rate; determining whether at least one of the sample credits is available; upon determining that at least one of the sample credits is available, queuing the replicated packet to the port of the network device and decrementing the number of sample credits; and upon determining that at least one of the sample credits is not available, dropping the replicated packet. The number of sample credits may be the predetermined number of samples available during the predetermined time interval.

In another implementation, the network device may include a plurality of monitoring points. In addition, the method may include: receiving packets over the network at the plurality of monitoring points of the network device; replicating the received packets; and assigning an identification hash key to each of the received packets. Each of the plurality of monitoring points may be uniquely associated with a different identification hash key. Thus, by identifying each received packet with a unique identification hash key, packets received at different monitoring points may be distinguished from one another.

The method may also include updating a total number of packets exported in a memory of the network device upon exporting the queued packet.

In another implementation, the method may include: updating a total number of packets observed at the monitoring point in the memory of the network device upon receiving a packet over the network at the monitoring point of the network device. In addition, when determining whether to eliminate the queued packet, the method may include: calculating a predicted number of samples observed at the monitoring point by multiplying the total number of packets exported by the configured sample rate. The current sample rate is less than the configured sample rate when the predicted number of samples observed at the monitoring point is less than the total number of samples observed at the monitoring point, and the current sample rate is greater than or equal to the configured sample rate when the predicted number of samples observed at the monitoring point is greater than or equal to the total number of samples observed at the monitoring point.

In yet another implementation, the network device may include an ASIC and a field-programmable gate array ("FPGA"). For example, the ASIC may determine whether to sample the replicated packet using a time-based sampling scheme. In addition, the FPGA may determine whether to eliminate the queued packet by comparing a configured sample rate with a current sample rate.

One of ordinary skill in the art would understand that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for compensating for time-based sampling using sample packet elimination, it will become evident to those skilled in the art that the implementations are not limited thereto.

Figure 1A:
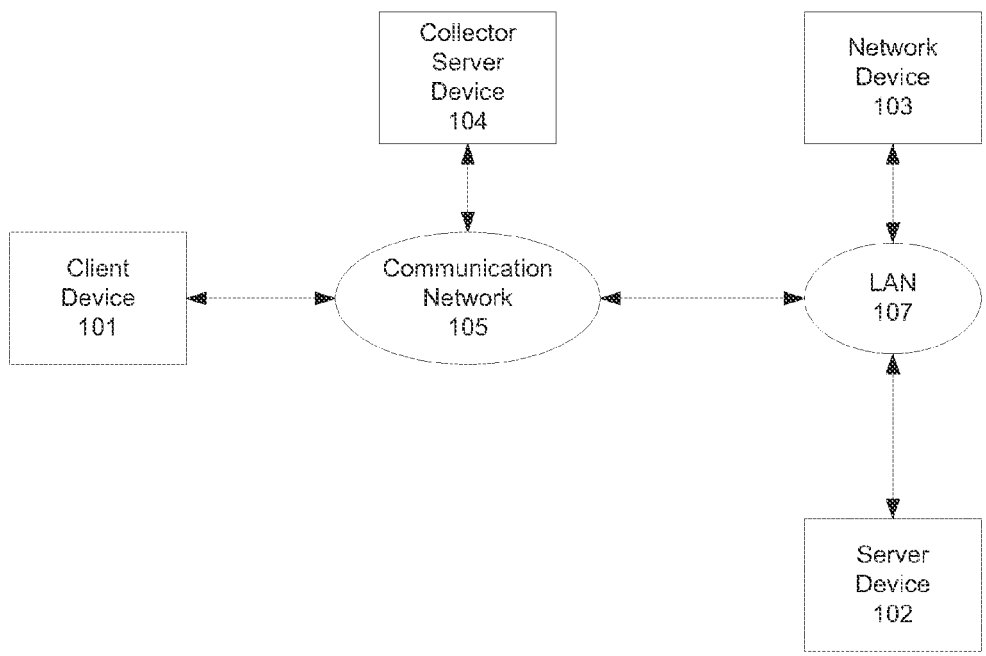
FIG. 1A illustrates a block diagram of a system for collecting network flow data.

Referring to FIG. 1A, a block diagram of a system for collecting network flow data is shown. The system may include a client device 101, a server device 102, a network device 103 and a collector server device 104. The devices may be communicatively connected to a communication network 105. For example, the communication network 105 may be the Internet. In addition, any of the devices may be connected to the communication network 105 through a LAN 107. As shown in FIG. 1A, the server device 102 and the network device 103 are connected to the communication network 105 through LAN 107. The network connections linking each device to the communication network 105 may be implemented by any medium that facilitates data exchange between nodes. Example communication links include, but are not limited to, a network such as a LAN, WAN, Ethernet, the Internet, or any other wired or wireless link such as Wi-Fi, WiMAX, 3G or 4G. One of ordinary skill in the art would understand that the example system shown in FIG. 1A is only one example system and that other network configurations having more or less network nodes may be possible.

It may be desirable to collect and analyze network flow data in order to characterize overall network traffic. In some implementations, packets may be sampled at network monitoring points. For example, packets may be sampled at one or more interfaces of the network device 103. Example network devices include, but are not limited to, switches, routers, hubs, bridges, etc. The packets may be flowing between a client and server such as the client device 101 and the server device 102, for example, via the network device 103. The network device 103 may generate and export network flow records to the collector server device 104, which is a device remote and external to the network device 103. The collector server device 104 may host the application service that analyzes the network flow data to characterize overall network traffic. In particular, the collector server device 104 may predict the amount of network traffic based on the exported network flow records. Prior to exporting the sampled packet, the network device 103 may be configured to include the following information in the network flow records: an ingress port of the network device, an egress port of the network device, a sequence number (i.e., a flow sample number), the total number of packets observed at the monitoring point, the number of dropped sample packets, the packet section (i.e., a configurable number of bytes offset from the start of the packet), the sample rate, the monitoring point, the packet section offset, and/or any other information related to the sampled packet and the monitoring point.

Figure 1B:
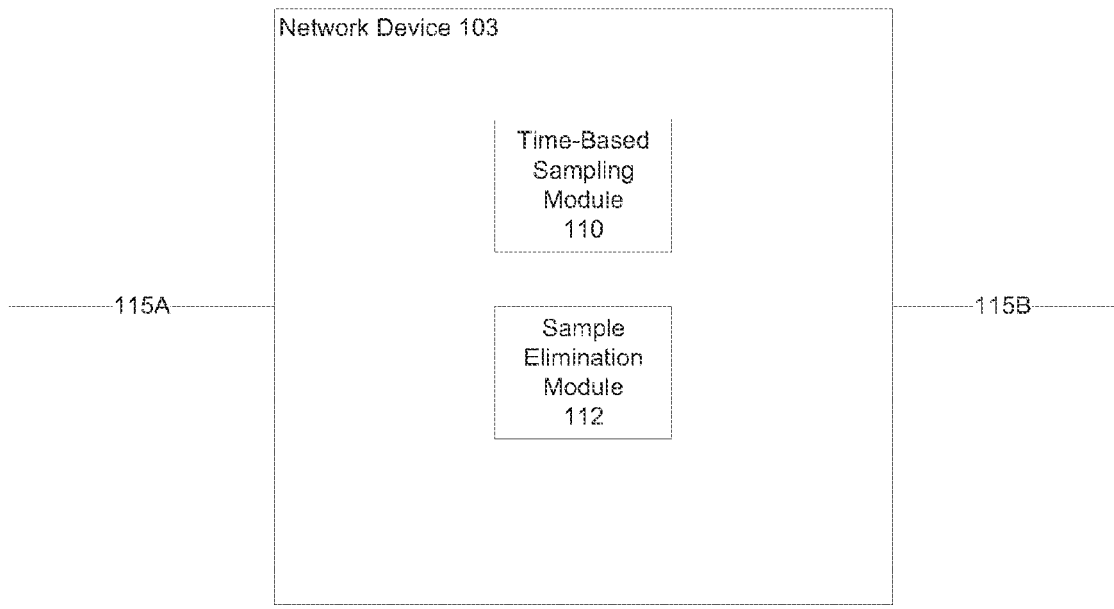
FIG. 1B illustrates a simplified logical block diagram of a network device that compensates for time-based sampling by packet elimination.

Referring to FIG. 1B, a logical block diagram of the network device 103 that compensates for time-based sampling by sample elimination is shown. A packet may ingress and egress to/from the network device 103 via communication links 115A and 115B, which may be any type of mechanism or medium that facilitates data communication with the communication network 105. In addition, the network device 103 may include a time-based sampling module 110 and a sample elimination module 112. The time-based sampling module 110 may be configured to sample a predetermined number of packets observed at a monitoring point every predetermined time interval. For example, the time-based module may be configured to sample 1 out of every 32 packets observed at the monitoring point (i.e., 1-in-32 sampling). Accordingly, the sample rate is 32 in this example. Preferably, the sample rate may be a power of 2 (i.e., $2^0, 2^1, 2^2 \ldots 2^N$) to achieve 1-in-1, 1-in-2, 1-in-4 . . . 1-in-N sampling, respectively.

In addition, the time-based sampling module 110 may be implemented using a credit refresh scheme. For example, a number of sample credits may be allocated each predetermined time interval. Each time an observed packet is sampled during the predetermined time interval, the number of sample credits may be decremented by one (1) sample. This may occur until all of the sample credits are exhausted in the predetermined time interval. After the predetermined time interval expires, the sample credits may be re-allocated. The credit refresh scheme may be based on the maximum expected packet rate at the monitoring point of the network device 103. For example, if the monitoring point of the network device 103 is a 1 Gigabit port, the maximum expected packet rate is 1.488 Mpps (assuming a 64 byte packet size). In addition, if the configured sample rate is 32 (1-in-32 sampling), forty-seven packets may preferably be sampled every millisecond. Accordingly, forty-seven sample credits may be allocated every millisecond.

As discussed above, when a packet is received at a network monitoring point, it may undergo time-based sampling (i.e., a coarse level of sampling). The time-based sampling module 110 may also be configured to update the total number of packets observed at the monitoring point in memory of the network device 103, for example. If the observed packet is flagged for sampling, then the observed packet may be replicated. The packet may be replicated for the purposes of sampling so that the network flow is undisturbed. For example, a single copy of the packet may be made for the purposes of sampling. In other words, the observed packet may undergo normal ingress and forwarding operations within the network device 103, and a single copy of the observed packet is made for the purposes of sampling, which makes the sampling process transparent. Optionally, packets may be received and replicated at more than one monitoring point of the network device 103, and the replicated packets may subsequently be handled by the same resources of the network device 103. In this implementation, a single copy of each packet received at each of the network monitoring points may be made for the purposes of sampling. Therefore, the time-based sampling module 110 may be configured to assign an identification hash value to each received packet that is unique to the monitoring point on which the packet is received. Accordingly, a hashing algorithm may be utilized by the network resources (i.e., the time-based sampling module 110 and the sample elimination module 112) to distinguish among the replicated packets. In particular, the replicated packets from different monitoring points will hash into different flows.

After the packet has been received and replicated, the time-based sampling module 110 may be configured to sample only a subset of all of the replicated packets during each predetermined time interval using, for example, the credit refresh scheme discussed above. If the replicated packet is to be sampled (i.e., a sample credit is available), the replicated packet may be queued to a port of the network device 103. The port of the network device 103 may be a port that is hidden from the client device and server devices in order to maintain transparency. Alternatively, if the replicated packet is not to be sampled (i.e., a sample credit is unavailable), the replicated packet may be dropped such that it is not queued to the port of the network device 103. Accordingly, the time-based sampling module 110 may provide a coarse level of sampling. In addition, in some implementations, it may be possible to exploit the existing capability of the ASIC of the network device 103 in order to implement the time-based sampling module 110.

As discussed above, the time-based sampling module 110 is implemented based on the maximum expected packet rate at the monitoring point. However, the actual observed packet rate at the monitoring point may, at times, be less than the maximum expected packet rate. Accordingly, the time-based sampling module 110 overcompensates, or samples more packets than required to achieve the configured sample rate. Oversampling may have undesirable consequences when estimating characteristics of the overall network traffic using the collector server device 104, for example. In addition, oversampling places an unnecessary burden on network resources because additional samples are processed above the configured required number of samples. Therefore, the sample elimination module 112 may be configured to provide a finer level of sampling in addition to the coarse level of sampling provided by the time-based sampling module 110.

After the replicated packets have been queued to the port of the network device 103, the sample elimination module 112 may be configured to eliminate queued packets before exporting the packets (i.e., to the collector server device 104, for example) to achieve the configured sample rate. For example, the sample elimination module 112 may be configured to compare the current sample rate to the configured sample rate to determine whether to eliminate the queued packets before export. If the current sample rate is less than the configured sample rate, the sample elimination module 112 may be configured to export the packet from the network device 103. However, if the current sample rate is greater than or equal to the configured sample rate, the sample elimination module 112 may be configured to drop the packet. In another implementation, if the current sample rate is approximately less than the configured sample rate, the sample elimination module 112 may be configured to export the packet from the network device 103. However, if the current sample rate is approximately greater than or equal to the configured sample rate, the sample elimination module 112 may be configured to drop the packet. In this implementation, there may be a tolerance, for example +/−5%, and the determination as to whether to drop or export the queued replicated packet may be made based on the configured sample rate plus or minus the tolerance (i.e., +/−5%).

In some implementations, it may be possible to compare the current sample rate to the configured sample rate as discussed below. Specifically, it may be possible to predict the total number of packets that should have been observed at the monitoring point and compare the predicted number of packets to the total number of packets actually observed at the monitoring point. The above comparison may be performed using data maintained by the network device 103. For example, as discussed above, the time-based sampling module 110 may be configured to update the total number of packets observed at the monitoring point upon receipt in memory of the network device 103. In Eqn. (1) below, the total number of packets observed at the monitoring point is the "samplePool." In addition, the sample elimination module 112 may be configured to update the number of packets actually exported in memory of the network device 103. In Eqn. (1) below, the number of packets actually exported is the "sequenceNumber." Accordingly, the predicted number of packets that should have been observed (i.e., "predictedSamplePool" in Eqn. (1) below) may be calculated by multiplying the number of packets actually exported by the configured sample rate (i.e., "configuredSampleRate" in Eqn. (1) below). If the predicted number of packets is less than the total number of packets observed at the monitoring point, the sample elimination module 112 may be configured to export the packet from the network device 103. However, if the predicted number of packets is greater than or equal to the total number of packets observed at the monitoring point, the sample elimination module 112 may be configured to drop the packet. Accordingly, the sample elimination module 112 may provide a finer level of sampling. In addition, in some implementations, it may be possible to exploit the existing capability of the FPGA of the network device 103 in order to implement the sample elimination module 112.

The example operations discussed above are shown in Eqn. (1):

$$
\begin{aligned}
&\text{predictedSamplePool} = \text{sequenceNumber} * \text{configuredSampleRate}; \\
&\text{sampleEliminate} = \\
&(\text{samplePool} < \text{predictedSamplePool}) \;?\; 1 : 0; \\
&\text{if( sampleEliminate )} \\
&\quad \text{drop packet;} \\
&\text{else} \\
&\quad \text{export packet;}
\end{aligned} \quad (1)
$$

In another implementation, if the predicted number of packets is approximately less than the total number of packets observed at the monitoring point, the sample elimination module 112 may be configured to export the packet from the network device 103. However, if the predicted number of packets is approximately greater than or equal to the total number of packets observed at the monitoring point, the sample elimination module 112 may be configured to drop the packet. In this implementation, there may be a tolerance, for example +/−5%, and the determination as to whether to drop or export the queued replicated packet may be made based on the total number of packets observed at the monitoring point plus or minus the tolerance (i.e., +/−5%).

Figure 2A:
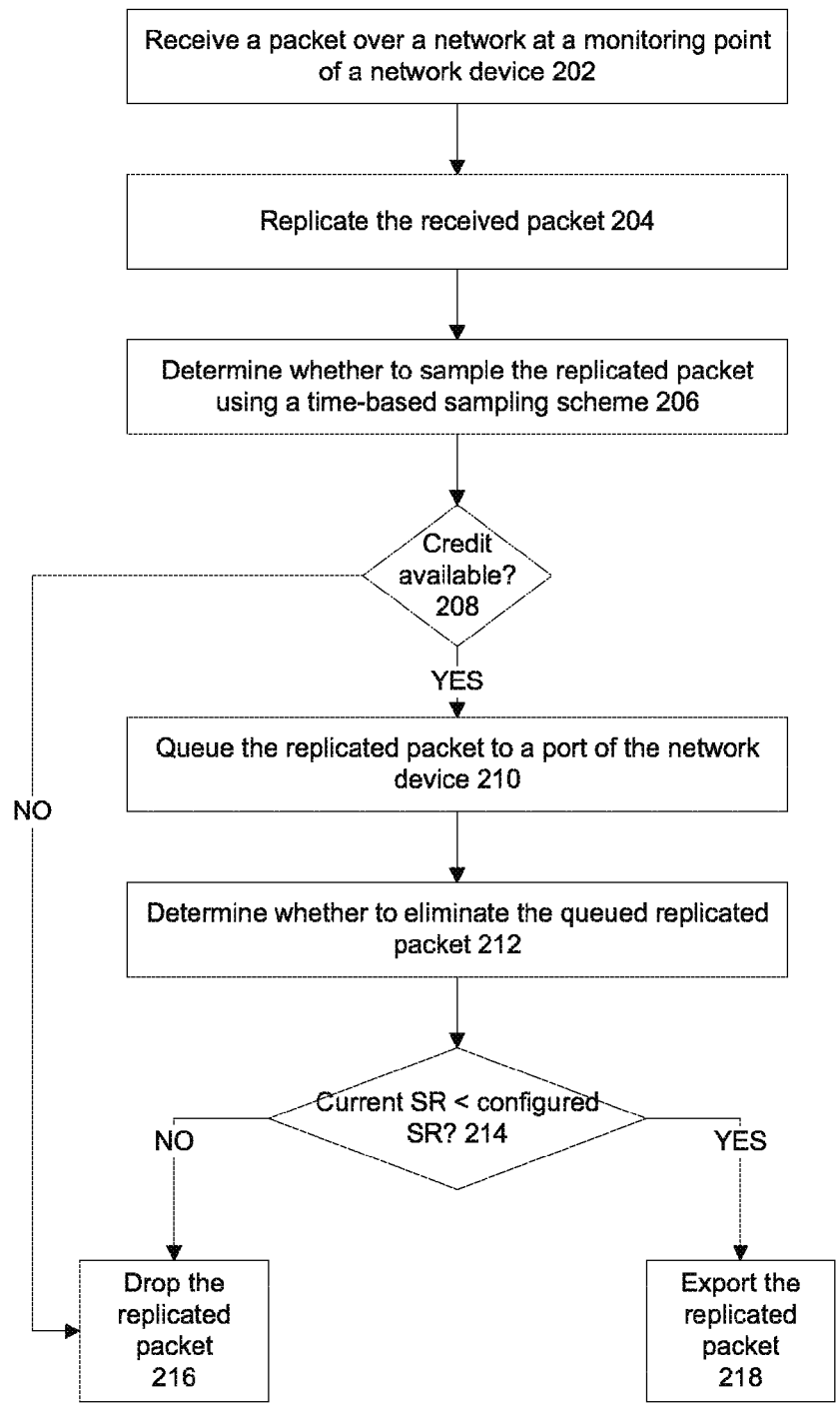
FIGS. 2A and 2B illustrates example operations for compensating for time-based sampling by packet elimination.
Figure 2B:
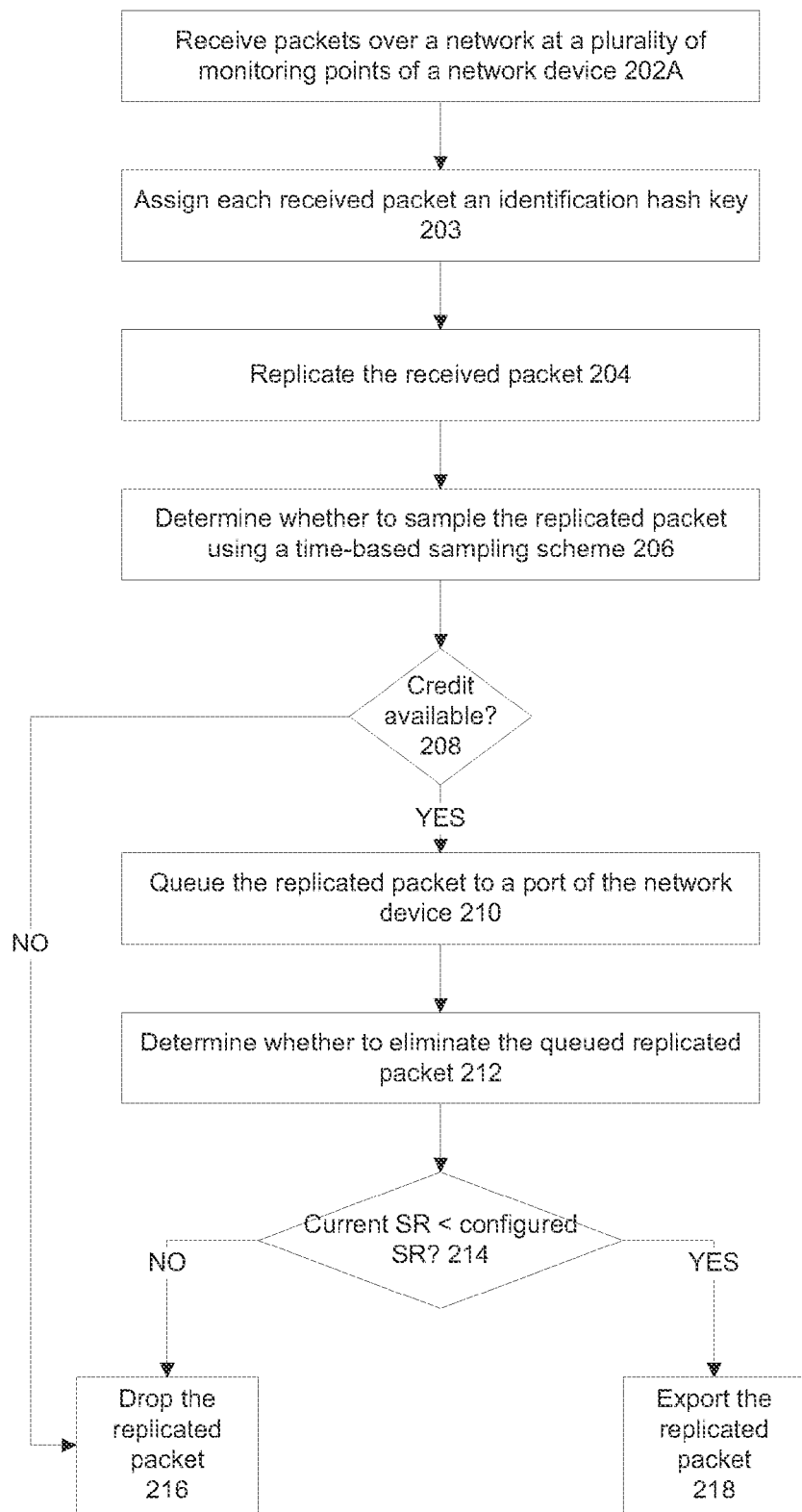

Referring to FIGS. 2A and 2B, example operations for compensating for time-based sampling by packet elimination are shown. In FIG. 2A, a packet may be received over a network at a monitoring point of a network device at 202. Upon receiving the packet, the total number of packets received at the monitoring point of the network device may be updated, for example, in memory of the network device. At 204, the received packet may be replicated for the purposes of sampling so that the sampling process is transparent. For example, a single copy of the packet may be made for the purposes of sampling. As discussed above, the received packet may undergo normal ingress and forwarding operations in the network device, and the replicated packet may be processed for sampling. Thereafter, at 206, a determination is made as to whether the replicated packet should be sampled using a time-based sampling scheme. The time-based sampling scheme may be configured to sample N packets every predetermined time interval, and the time-based sampling scheme may be implemented using the maximum expected packet rate at the monitoring point of the network device. For example, at 208, a credit refresh scheme may be utilized. If a sample credit is available, then the replicated packet may be queued to a port of the network device at 210. However, if a sample credit is not available, then the replicated packet may be dropped at 216. As discussed above, the time-based sampling scheme, such as the credit refresh scheme, may be implemented using the existing capabilities of the ASIC of the network device, for example. After the packets have been queued to the port of the network device, a determination may be made to eliminate the queued packet at 212. Because the time-based sampling scheme may overcompensate (i.e., sample too many packets), it may be possible to achieve the configured sample rate by eliminating the queued packet. For example, at 214, the current sample rate may be compared to the configured sample rate. If the current sample rate is less than the configured sample rate, the packet may be exported from the network device at 218. In addition, when the packet is exported from the network device, the total number of exported packets may be updated, for example, in memory of the network device. However, if the current sample rate is greater than or equal to the configured sample rate, the packet may be dropped at 216.

The operations shown in FIG. 2B are similar to the operations shown in FIG. 2A. At 202A, packets may be received over a network at a plurality of monitoring points of a network device. Because the replicated packets may subsequently be handled by the same resources of the network device an identification hash value may be assigned to each received packet that is unique to the monitoring point on which the packet was received. Accordingly, a hashing algorithm may be utilized by the network resources to distinguish among the replicated packets. The remaining steps shown in FIG. 2B are identical to the steps shown in FIG. 2A and are therefore not discussed in detail below.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device.

Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 3:
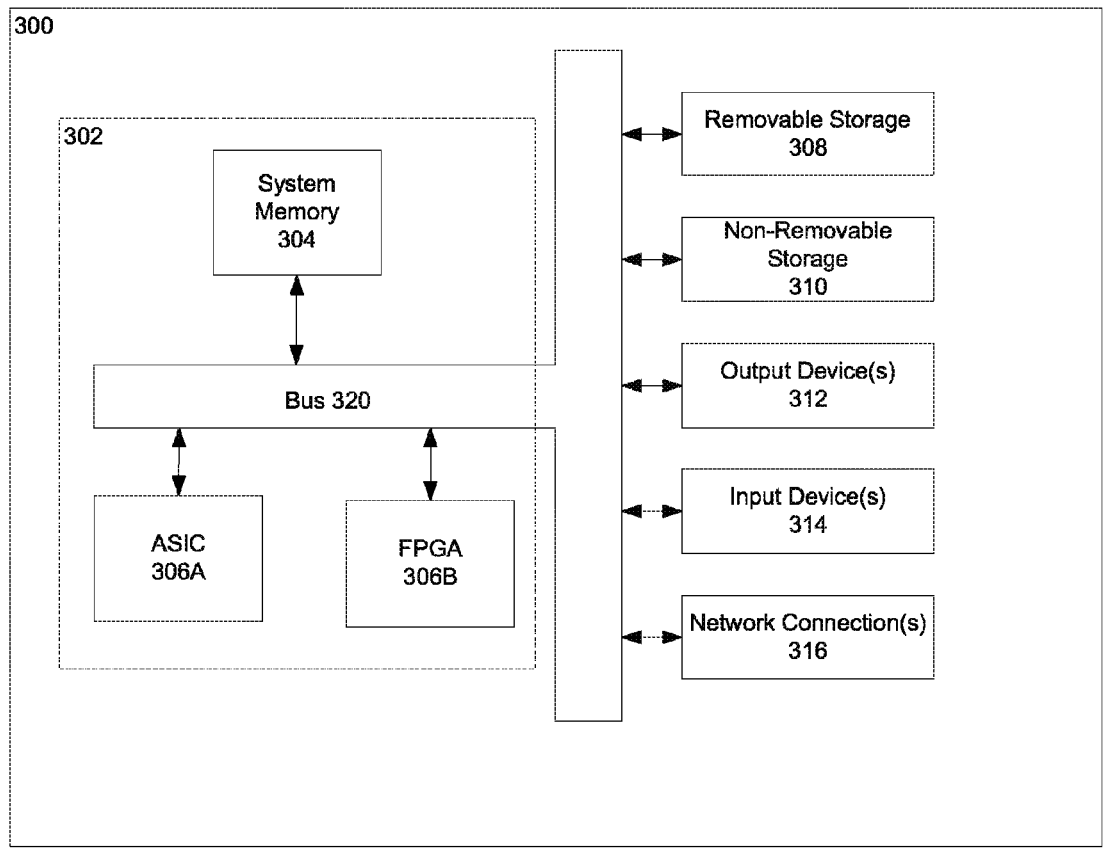
FIG. 3 illustrates a simplified block diagram of a computing device.

When the logical operations described herein are implemented in software, the process may execute on any type of computing architecture or platform. For example, referring to FIG. 3, an example computing device upon which embodiments of the invention may be implemented is illustrated. In particular, the network device discussed above may be a computing device, such as computing device 300 shown in FIG. 3. The computing device 300 may include a bus 320 or other communication mechanism for communicating information among various components of the computing device 300. In its most basic configuration, computing device 300 may include an ASIC 306A, an FPGA 306B and system memory 304. Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 3 by dashed line 302. The ASIC 306A may be an IC configured for a particular use. In the embodiments discussed above, the ASIC 306A may be configured to implement logical functions required by the network device, including the time-based sampling module 110, for example. In addition, the FPGA 306B may be an IC that is capable of implementing the same logical functions as the ASIC 306A. However, unlike the ASIC 306A, the FPGA 306B may be configured (i.e., programmed) by a customer post-manufacture. In the embodiments discussed above, the FPGA 306B may be configured to implement the sample elimination module 114, for example.

Computing device 300 may have additional features/functionality. For example, computing device 300 may include additional storage such as removable storage 308 and non-removable storage 310 including, but not limited to, magnetic or optical disks or tapes. Computing device 300 may also contain network connection(s) 316 that allow the device to communicate with other devices. Computing device 300 may also have input device(s) 314 such as a keyboard, mouse, touch screen, etc. Output device(s) 314 such as a display, speakers, printer, etc. may also be included. The additional devices may be connected to the bus 320 in order to facilitate communication of data among the components of the computing device 300. All these devices are well known in the art and need not be discussed at length here.

The ASIC 306A and/or FPGA 306B may be configured to execute program code encoded in tangible, computer-readable media. Computer-readable media refers to any media that is capable of providing data that causes the computing device 300 (i.e., a machine) to operate in a particular fashion. Various computer-readable media may be utilized to provide instructions to the ASIC 306A and/or FPGA 306B for execution. Common forms of computer-readable media include, for example, magnetic media, optical media, physical media, memory chips or cartridges, a carrier wave, or any other medium from which a computer can read. Example computer-readable media may include, but are not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication.

In an example implementation, the ASIC 306A and/or FPGA 306B may execute program code stored in the system memory 304. For example, the bus 320 may carry data to the system memory 304, from which the ASIC 306A and/or FPGA 306B receives and executes instructions. The data received by the system memory 304 may optionally be stored on the removable storage 308 or the non-removable storage 310 before or after execution by the ASIC 306A and/or FPGA 306B.

Computing device 300 typically includes a variety of computer-readable media. Computer-readable media can be any available media that can be accessed by device 300 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 304, removable storage 308, and non-removable storage 310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of computing device 300.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for compensating for time-based sampling by sample elimination in a network device communicatively connected to a network, the method comprising:
    receiving a packet over the network at a monitoring point of the network device;
    replicating the received packet;
    determining whether to sample the replicated packet using a time-based sampling scheme, wherein the time-based sampling scheme comprises sampling a predetermined number of samples during a predetermined time interval;
    upon determining that the replicated packet should be sampled, queuing the replicated packet to a port of the network device;
    adjusting for oversampling caused by the time-based sampling scheme by:
        determining whether to eliminate the queued packet by comparing a configured sample rate with a current sample rate;
        upon determining that the current sample rate is less than the configured sample rate, exporting the queued packet from the network device; and
        upon determining that the current sample rate is greater than or equal to the configured sample rate, dropping the queued packet.

2. The method of claim 1, further comprising, in response to determining that the replicated packet should not be sampled, dropping the replicated packet.

3. The method of claim 2, wherein determining whether to sample the replicated packet using a time-based sampling scheme further comprises:
    allocating a number of sample credits during the predetermined time interval based on a maximum expected packet rate at the monitoring point of the network device and the configured sample rate, the number of sample credits being the predetermined number of samples available during the predetermined time interval;
    determining whether at least one of the sample credits is available;
    upon determining that at least one of the sample credits is available, queuing the replicated packet to the port of the network device and decrementing the number of sample credits; and
    upon determining that at least one of the sample credits is not available, dropping the replicated packet.

4. The method of claim 1, wherein the network device comprises a plurality of monitoring points, and the method further comprises:
    receiving packets over the network at the plurality of monitoring points of the network device;
    replicating the received packets; and
    assigning an identification hash key to each of the received packets, each of the plurality of monitoring points being uniquely associated with a different identification hash key.

5. The method of claim 1, further comprising, upon exporting the queued packet, updating a total number of packets exported in a memory of the network device.

6. The method of claim 5, further comprising:
    upon receiving the packet over the network at the monitoring point of the network device, updating a total number of packets observed at the monitoring point in the memory of the network device, wherein determining whether to eliminate the queued packet further comprises calculating a predicted number of samples observed at the monitoring point by multiplying the total number of packets exported by the configured sample rate, wherein:

the current sample rate is less than the configured sample rate when the predicted number of samples observed at the monitoring point is less than the total number of samples observed at the monitoring point, and the current sample rate is greater than or equal to the configured sample rate when the predicted number of samples observed at the monitoring point is greater than or equal to the total number of samples observed at the monitoring point.

7. The method of claim 1, wherein the network device comprises an ASIC and an FPGA, and the method further comprises:

determining whether to sample the replicated packet using a time-based sampling scheme using the ASIC; and determining whether to eliminate the queued packet by comparing a configured sample rate with a current sample rate using the FPGA.

8. A network device that compensates for time-based sampling by packet elimination, comprising:

an interface configured to receive a packet over a network, the interface being a monitoring point of the network device;

a first processing unit configured to:
   replicate the received packet;
   determine whether to sample the replicated packet using a time-based sampling scheme, wherein the time-based sampling scheme comprises sampling a predetermined number of samples during a predetermined time interval; and
   upon determining that the replicated packet should be sampled, queue the replicated packet to a port of the network device; and a second processing unit configured to adjust for oversampling caused by the time-based sampling scheme by:
   determining whether to eliminate the queued packet by comparing a configured sample rate with a current sample rate;
   upon determining that the current sample rate is less than the configured sample rate, exporting the queued packet from the network device; and
   upon determining that the current sample rate is greater than or equal to the configured sample rate, dropping the queued packet.

9. The network device of claim 8, wherein the first processing unit is further configured to, in response to determining that the replicated packet should not be sampled, drop the replicated packet.

10. The network device of claim 9, wherein when determining whether to sample the replicated packet using a time-based sampling scheme, the first processing unit is further configured to:

allocate a number of sample credits during the predetermined time interval based on a maximum expected packet rate at the monitoring point of the network device and the configured sample rate, the number of sample credits being the predetermined number of samples available during the predetermined time interval;

determine whether at least one of the sample credits is available;

upon determining that at least one of the sample credits is available, queue the replicated packet to the port of the network device and decrement the number of sample credits; and upon determining that at least one of the sample credits is not available, drop the replicated packet.

11. The network device of claim 8, wherein the network device further comprises a plurality of interfaces configured to receive packets over the network, the plurality of interfaces being a plurality of monitoring points of the network device, and the first processing unit is further configured to:

replicate the received packets; and assign an identification hash key to each of the received packets, each of the plurality of monitoring points being uniquely associated with a different identification hash key.

12. The network device of claim 8, wherein the second processing unit is further configured to, upon exporting the queued packet, update a total number of packets exported in a memory of the network device.

13. The network device of claim 12, wherein the first processing unit is further configured to, upon receiving the packet over the network at the monitoring point of the network device, update a total number of packets observed at the monitoring point in the memory of the network device, and when determining whether to eliminate the queued packet, the second processing unit is further configured to calculate a predicted number of samples observed at the monitoring point by multiplying the total number of packets exported by the configured sample rate, wherein:

the current sample rate is less than the configured sample rate when the predicted number of samples observed at the monitoring point is less than the total number of samples observed at the monitoring point, and the current sample rate is greater than or equal to the configured sample rate when the predicted number of samples observed at the monitoring point is greater than or equal to the total number of samples observed at the monitoring point.

14. The network device of claim 8, wherein the first processing unit is an ASIC and the second processing unit is an FPGA.

15. A non-transitory computer-readable recording medium having computer-executable instructions stored thereon for compensating for time-based sampling by sample elimination that, when executed by a first processing unit of a network device, cause the first processing unit to:

receive a packet over the network at a monitoring point of the network device;

replicate the received packet;

determine whether to sample the replicated packet using a time-based sampling scheme, wherein the time-based sampling scheme comprises sampling a predetermined number of samples during a predetermined time interval; and upon determining that the replicated packet should be sampled, queue the replicated packet to a port of the network device, and the non-transitory computer-readable recording medium having further computer-executable instructions stored thereon that, when executed by a second processing unit of the network device, cause the second processing unit to adjust for oversampling caused by the time-based sampling scheme by:

determining whether to eliminate the queued packet by comparing a configured sample rate with a current sample rate;

upon determining that the current sample rate is less than the configured sample rate, exporting the queued packet from the network device; and upon determining that the current sample rate is greater than or equal to the configured sample rate, dropping the queued packet.

16. The non-transitory computer-readable recording medium of claim 15, having further computer-executable instructions stored thereon that, when executed by the first processing unit, cause the first processing unit to drop the replicated packet in response to determining that the replicated packet should not be sampled.

17. The non-transitory computer-readable recording medium of claim 16, having further computer-executable instructions stored thereon that, when executed by the first processing unit, cause the first processing unit to:

allocate a number of sample credits during the predetermined time interval based on a maximum expected packet rate at the monitoring point of the network device and the configured sample rate, the number of sample credits being the predetermined number of samples available during the predetermined time interval;

determine whether at least one of the sample credits is available;

upon determining that at least one of the sample credits is available, queue the replicated packet to the port of the network device and decrement the number of sample credits; and upon determining that at least one of the sample credits is not available, drop the replicated packet.

18. The non-transitory computer-readable recording medium of claim 15, having further computer-executable instructions stored thereon that, when executed by the first processing unit, cause the first processing unit to:

receive packets over the network at a plurality of monitoring points of the network device;

replicate the received packets; and assign an identification hash key to each of the received packets, each of the plurality of monitoring points being uniquely associated with a different identification hash key.

19. The non-transitory computer-readable recording medium of claim 15, having further computer-executable instructions stored thereon that, when executed by the second processing unit, cause the second processing unit to update a total number of packets exported in a memory of the network device upon exporting the queued packet.

20. The non-transitory computer-readable recording medium of claim 19, having further computer-executable instructions stored thereon that, when executed by the first processing unit, cause the first processing unit to update a total number of packets observed at the monitoring point in the memory of the network device upon receiving the packet over the network at the monitoring point of the network device, and the computer-readable recording medium having further computer-executable instructions stored thereon that, when executed by the second processing unit, cause the second processing unit to calculate a predicted number of samples observed at the monitoring point by multiplying the total number of packets exported by the configured sample rate, wherein:

the current sample rate is less than the configured sample rate when the predicted number of samples observed at the monitoring point is less than the total number of samples observed at the monitoring point, and the current sample rate is greater than or equal to the configured sample rate when the predicted number of samples observed at the monitoring point is greater than or equal to the total number of samples observed at the monitoring point.

* * * * *